(12) United States Patent
Burkman et al.

(10) Patent No.: US 9,713,965 B2
(45) Date of Patent: Jul. 25, 2017

(54) VARIABLE PRECHARGE TIMING

(71) Applicant: Ford Global Technologies, LLC, Dearborn, MI (US)

(72) Inventors: Wesley Edward Burkman, Dearborn, MI (US); Ryan J. Skaff, Farmington Hills, MI (US); Karin Lovett, Novi, MI (US); Bryan Michael Bolger, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 14/279,875

(22) Filed: May 16, 2014

(65) Prior Publication Data
US 2015/0329006 A1 Nov. 19, 2015

(51) Int. Cl.
*B60L 11/18* (2006.01)
*H02P 1/04* (2006.01)
*B60L 15/20* (2006.01)
*B60L 7/14* (2006.01)
*B60L 11/12* (2006.01)
*B60L 11/14* (2006.01)

(52) U.S. Cl.
CPC ............ *B60L 15/2054* (2013.01); *B60L 7/14* (2013.01); *B60L 11/123* (2013.01); *B60L 11/14* (2013.01); *B60L 11/1851* (2013.01); *B60L 11/1864* (2013.01); *B60L 15/20* (2013.01); *H02P 1/04* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/80* (2013.01); *B60L 2270/20* (2013.01); *Y02T 10/6217* (2013.01); *Y02T 10/645* (2013.01); *Y02T 10/7005* (2013.01); *Y02T 10/7061* (2013.01); *Y02T 10/7077* (2013.01); *Y02T 10/7241* (2013.01); *Y02T 10/7275* (2013.01)

(58) Field of Classification Search
None
See application file for complete search history.

(56) References Cited

U.S. PATENT DOCUMENTS

| 5,369,540 | A | 11/1994 | Konrad et al. |
| 6,597,072 | B2 | 7/2003 | Yamazaki et al. |
| 7,586,214 | B2 * | 9/2009 | Clarke ............... B60L 1/003 307/130 |

(Continued)

FOREIGN PATENT DOCUMENTS

CN 202513623 10/2012
WO 2013068021 5/2013

*Primary Examiner* — Jared Fureman
*Assistant Examiner* — Aqeel Bukhari
(74) *Attorney, Agent, or Firm* — Carlson, Gaskey & Olds, P.C.

(57) ABSTRACT

An example method includes intentionally precharging a powertrain of an electric vehicle for an first time period that is different than a second precharge time period. An example electric vehicle assembly includes a precharge contactor transitionable back and forth between an open state and a closed state, a first main contactor, a second main contactor, and a controller configured to selectively close the second main contactor after the precharge contactor has been closed for a first time period that is different than a second precharge time period.

20 Claims, 3 Drawing Sheets

(56) References Cited

U.S. PATENT DOCUMENTS

| | | |
|---|---|---|
| 8,432,058 B2 | 4/2013 | Matsukawa et al. |
| 8,574,004 B1 | 11/2013 | Tarchinski et al. |
| 2012/0229057 A1* | 9/2012 | Ogawa ................ B60L 11/1803 318/139 |
| 2013/0264995 A1* | 10/2013 | Lee ..................... B60L 11/1803 320/104 |

* cited by examiner

VARIABLE PRECHARGE TIMING

BACKGROUND

This disclosure relates generally to precharging when starting an electric vehicle. More particularly, this disclosure relates to varying a precharge time under some conditions, such as by increasing a time spent precharging.

Example electric vehicles include hybrid electric vehicles (HEVs), plug-in hybrid electric vehicles (PHEVs), battery electric vehicles (BEVs), and mild hybrid vehicles (mHEVs). Generally, hybrid vehicles differ from conventional vehicles because hybrid vehicles are selectively driven using a battery-powered electric machine. Conventional vehicles, by contrast, rely exclusively on an internal combustion engine to drive the vehicle.

An electrical power source, such as a battery, can be used to power a powertrain of an electric vehicle. Power from the battery is transferred to the electric machine. When the electric vehicle is off, the battery is disconnected from the rest of powertrain via contactors, for example. At start-up, the battery is reconnected to the portions of the powertrain.

The powertrain of an electric vehicle has significant capacitance. The capacitance has a very low resistance and can cause a large amount of in-rush current when the battery is reconnected and the capacitance charges. High in-rush current can damage components. Thus, many powertrains incorporate a precharge circuit to limit the in-rush current during the initial phase of start-up. The precharge circuit may incorporate a precharge contactor and resistor. The precharge circuit limits in-rush current by routing current through the precharge resistor.

As the capacitance is charged, the current decreases to a point where a main contactor, without the large resistance, can be connected. Prior art vehicles measure voltage to determine when to disconnect the precharge contactor.

SUMMARY

A method according to an exemplary aspect of the present disclosure includes, among other things, intentionally precharging a powertrain of an electric vehicle for a first time period that is different than a second precharge time period.

In another example of the foregoing method, the first time period is greater than the second precharge time period.

In another example of any of the foregoing methods, the first time period is an adjusted time period and the second time period is a baseline time period.

In another example of any of the foregoing methods, the method includes intentionally precharging in response to the electric vehicle starting remotely rather than not starting remotely.

In another example of any of the foregoing methods, the method further comprises intentionally precharging in response to the electric vehicle being unoccupied rather than occupied.

In another example of any of the foregoing methods, the method further comprises intentionally precharging in response to the electric vehicle charging.

In another example of any of the foregoing methods, the method further comprises stopping the precharging after both expiration of the first time period and a voltage differential falling below a threshold value.

In another example of any of the foregoing methods, the voltage differential is a voltage differential across a main contactor.

In another example of any of the foregoing methods, the first time period is used rather than the second precharge time period in response to at least one step in a start sequence completing before an allotted maximum time for the at least one step.

In another example of any of the foregoing methods, the second precharge time period is increased to the first time period an amount corresponding to a difference between the allotted maximum time for the at least one step and an actual time for the at least one step.

In another example of any of the foregoing methods, the at least one step includes at least a primary contactor close command step, a primary contactor closing step, a precharge contactor close command step, and a precharge contactor closing step.

In another example of any of the foregoing methods, the time spent precharging changes an in-rush current to the powertrain.

An electric vehicle assembly according to another exemplary aspect of the present disclosure includes, among other things, a precharge contactor transitionable back and forth between an open state and a closed state, and a controller configured to selectively keep the precharge contactor in the closed state for a first time period that is different than a second precharge time period.

In another example of the foregoing assembly, the first time period is greater than the second precharge time period.

In another example of any of the foregoing assemblies, the controller keeps the precharge contactor in the closed state for the first time period in response to the electric vehicle starting remotely rather than not starting remotely.

In another example of any of the foregoing assemblies, the controller is configured to transition a main contactor to a closed state after the first time period ends and a voltage differential falls below a threshold value. The main contactor in the closed state causing current to move through the main contactor rather than the precharge contactor.

In another example of any of the foregoing assemblies, the first time period is used rather than the second precharge time period when at least one step in a start sequence completes before an allotted maximum time for the at least one step. The first time period is greater than the second precharge time period by an amount representing a difference between the allotted maximum time for the at least one step and an actual time to complete the at least one step.

In another example of any of the foregoing assemblies, the time spent precharging changes an in-rush current to a powertrain of the electric vehicle.

In another example of any of the foregoing assemblies, the assembly includes a battery, a first main contactor having a first polarity, a second main contactor having a second polarity opposite the first polarity, and a precharge contactor. The controller is configured to transition the precharge contactor to the closed state to move current through the precharge resistor when the first main contactor is in a closed state and the second main contactor is in an open state.

In another example of any of the foregoing assemblies, the controller is configured to transition the second main contactor to the closed state in response to a delta voltage across the second main contactor that is less than a certain value.

In another example of any of the foregoing assemblies, a circuit between a battery and a motor is complete when the precharge contactor and the second main contactor are in a closed state, or when the first main contactor and the second main contactor are in the closed state.

In another example of any of the foregoing assemblies, the controller is a battery electric control module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
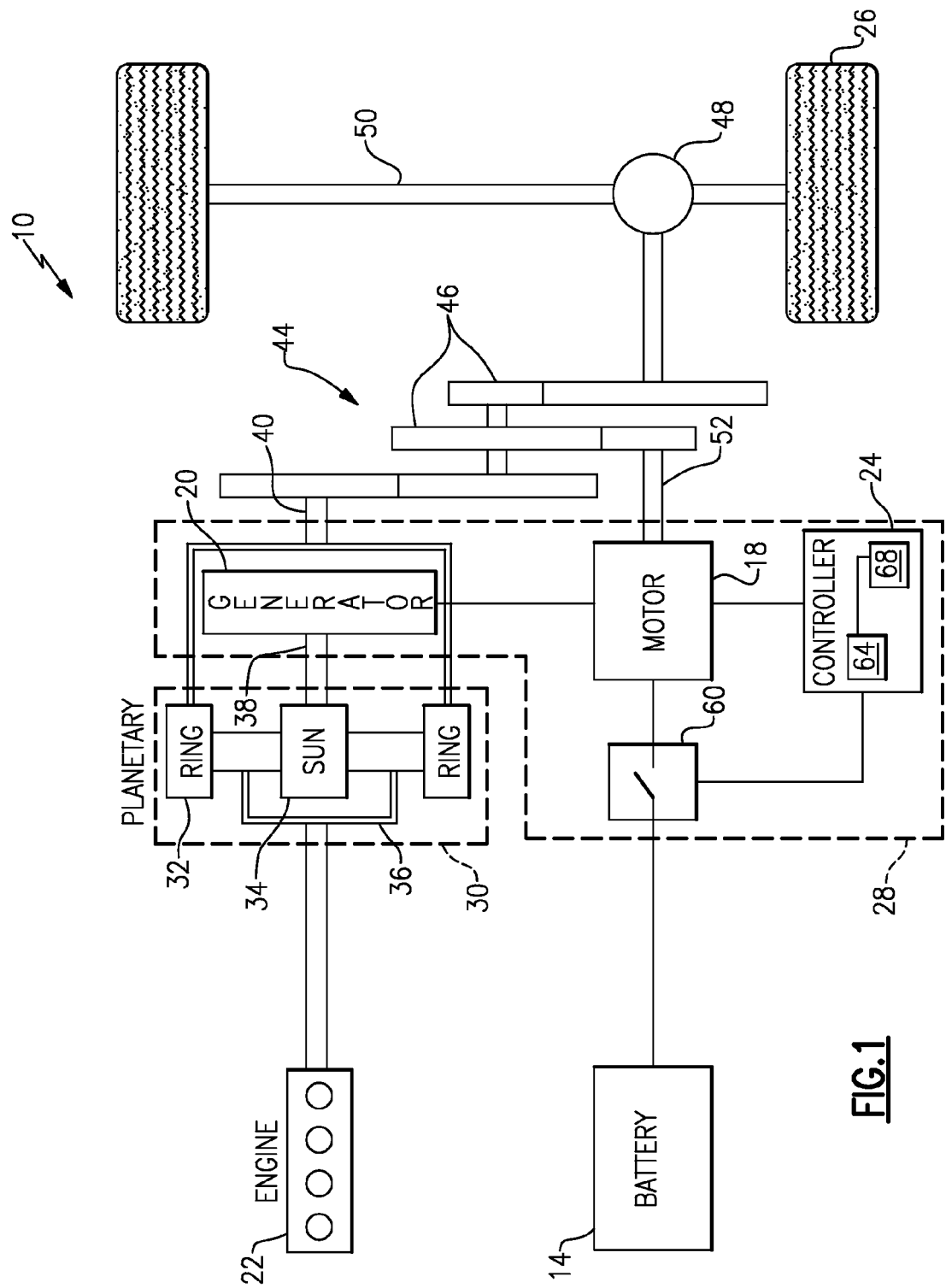
FIG. 1 illustrates a schematic view of an example powertrain of an electric vehicle.

FIG. 1 schematically illustrates a powertrain 10 for an electric vehicle. The powertrain 10 includes a battery 14, a motor 18, a generator 20, and an internal combustion engine 22.

Although depicted as a hybrid electric vehicle (HEV), it should be understood that the concepts described herein are not limited to an HEV and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of the generator 20 and the engine 22. The second drive system includes at least the motor 18, the generator 20, and a battery 14. The first and second drive systems generate torque to drive one or more sets of vehicle drive wheels 26 of the electric vehicle. The motor 18 and the generator 20, together with a controller 24, are an electric drive system 28 for the powertrain 10.

The engine 22 and the generator 20 may be connected through a power transfer unit 30, such as a planetary gear set. Other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 may be connected to a shaft 40, which is connected to vehicle drive wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery 14.

The battery 14 is an example type of electric vehicle battery assembly. The battery 14 may be a relatively high-voltage battery that is capable of outputting electrical power to operate the motor 18 and the generator 20. Other types of energy storage devices and/or output devices can also be used with the powertrain 10.

The powertrain controller 24 is operatively coupled to the internal combustion engine 22, the electric drive system 28, and the battery 14. In some examples, the controller 24 is an inverter system controller combined with a variable voltage converter (ISC/VVC). In other examples, the controller 24 is part of an engine control module, a battery electric control module, etc. within the vehicle. The controller 24 is configured to control specific components within the electric drive system 28, such as the generator 20, the motor 36, or both to support bidirectional power flow.

In this example, the controller 24 is configured to control a contactor assembly 60 to control current between the battery 14 and the remaining portions of the powertrain 10, such as the motor 18.

The example controller 24 includes a processor 64 operatively linked to a memory portion 68. The example processor 64 is programmed to execute a program stored in the memory portion 68. The program may be stored in the memory portion 68 as software code.

The program stored in the memory portion 68 may include one or more additional or separate programs, each of which includes an ordered listing of executable instructions for implementing logical functions.

The processor 64 can be a custom made or commercially available processor, a central processing unit (CPU), an auxiliary processor among several processors associated with the controller 24, a semiconductor-based microprocessor (in the form of a microchip or chip set) or generally any device for executing software instructions.

The memory portion 68 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 2:
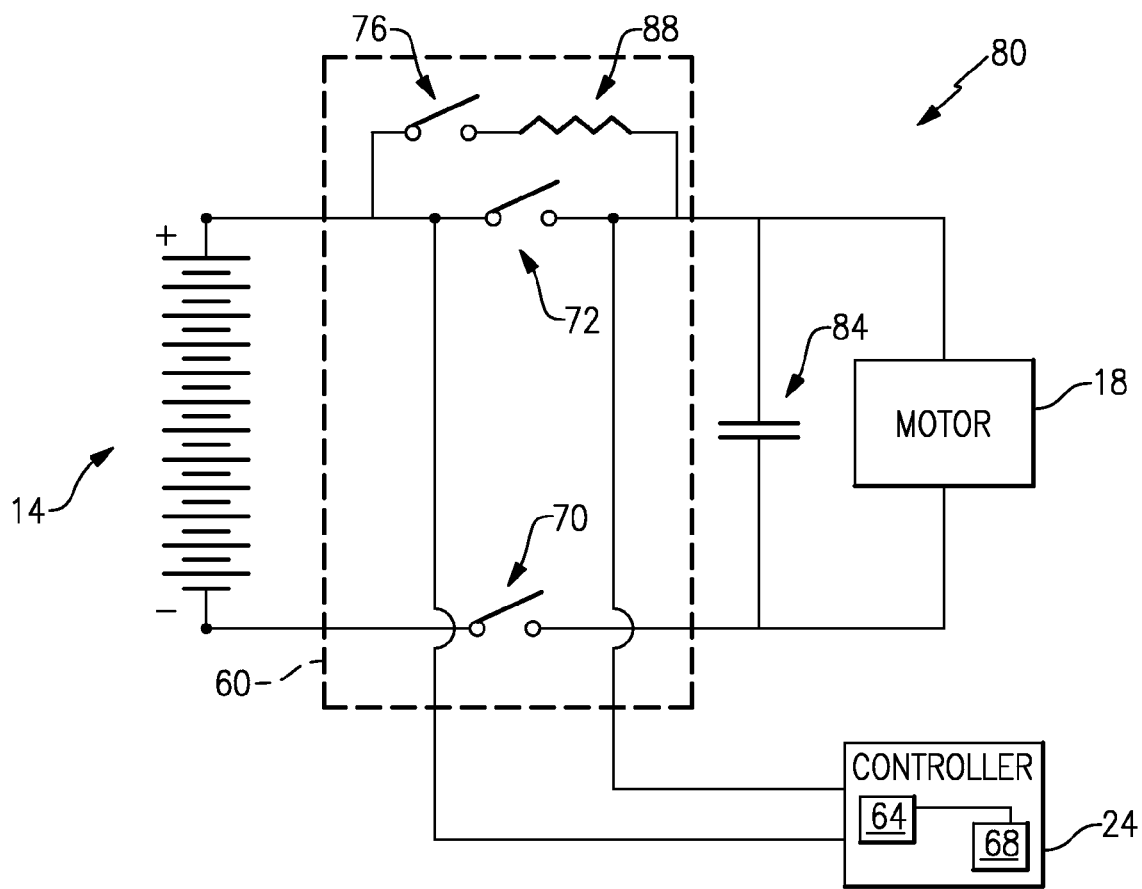
FIG. 2 shows a circuit diagram of the high voltage powertrain of FIG. 1.

Referring now to FIG. 2 with continued reference to FIG. 1, the example contactor assembly 60 includes a first main contactor 70, a second main contactor 72, and a precharge contactor 76. The contactors 70, 72, and 76 control current movement between the battery 14 and the motor 18, the generator 20, and other portions of the powertrain 10. The contactor assembly 60 forms part of a circuit 80 between the battery 14 and the motor 18.

In this example, the first main contactor 70 is associated with a negative terminal of the battery 14, and the second main contactor 72 is associated with a positive terminal of the battery.

Capacitance within the powertrain 10 or circuit 80 is represented as a capacitor 84 in FIG. 2. If not accounted for, the capacitance will cause a large amount of in-rush current when the powertrain 10 is started. The in-rush current can damage components of the powertrain 10. The contactor assembly 60 includes a resistor 88 used in connection with the precharge contactor 76 to reduce in-rush current on the circuit 80.

Each of the contactors 70, 72, and 76 can be transitioned from an open state to a closed state and from the closed state to the open state. The controller 24 is configured to control the transitions of the contactors 70, 72, and 76 in this example.

When the first main contactor 70 and the second main contactor 72 have both transitioned to a closed state, current is free to move through the circuit 80. When the precharge contactor 78 and the first main contactor 70 have both transitioned to a closed state, current is free to move through the circuit 80.

Generally, when the powertrain 10 starts, the controller 24 transitions the precharge contactor 76 and the first main contactor 70 to closed. After the capacitor 84 has at least partially charged, the controller 24 transitions the second main contactor 72 to closed. The precharge contactor 76 could optionally transition to open at this stage.

Figure 3:
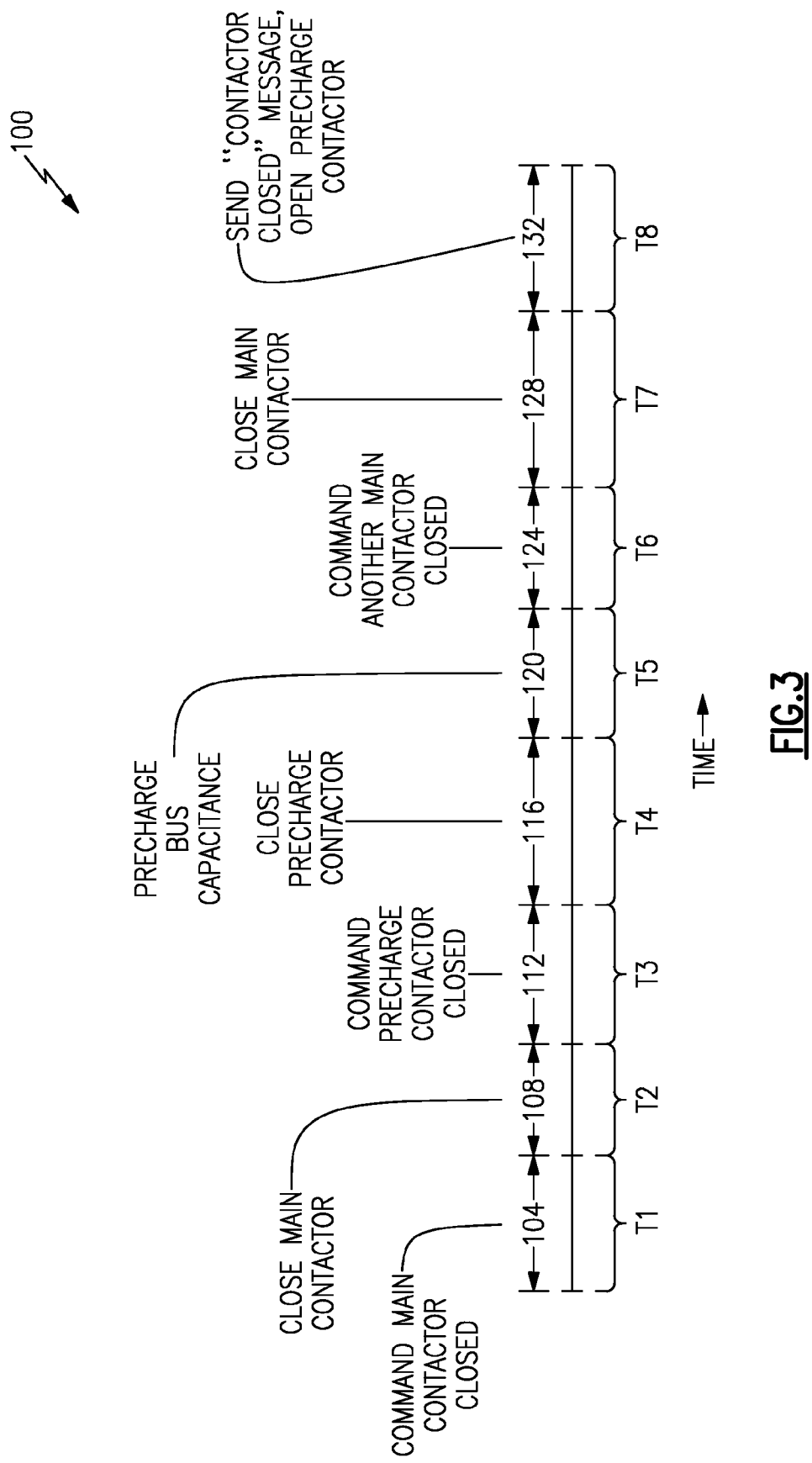
FIG. 3 shows the flow of an example baseline method for starting the powertrain of FIG. 2.

Transitioning the precharge contactor 76 to closed at start-up, rather than the second main contactor 72, causes current to be moved through the resistor 88, which reduces in-rush current Referring now to FIG. 3 with continuing reference to FIGS. 1 and 2, the flow of example baseline method 100 for starting the electric vehicle is described. The method 100 is executed as a program by the processor 64 of the controller 24.

The method 100 includes a step 104 of the controller 24 communicating a command to transition the first main contactor 70 to a closed state. A time T1 is allocated for completing the step 104. Next, at a step 108, the method 100 allocates some time T2 to close the first main contactor 70. The controller 24 then sends a command to transition the precharge contactor 76 to a closed state at a step 112, which takes a time T3.

At a step 116, the method 100 allocates a time T4 to close the precharge contactor 76. The method 100 then moves to a step 120 where a time T5 is spent precharging the capacitor 84 through the precharge contactor 76, and thus the resistor 88.

The method 100 then commands the second main contactor 72 to transition to closed at a step 124, and includes a step 128 for the second main contactor 72 to close. The step 124 is allocated a time T6, and the step 128 is allocated a time T7.

In some examples, the method 100 may commands the precharge contactor 76 to transition to an open state at a step 132, which takes a time T8. Opening the precharge contactor 76 is not required to complete the circuit 80, however. Provided the first main contactor 70 and the second main contactor 72 are closed, the circuit 80 is complete.

The method 100 sends a message that the close of the circuit 80 is complete and opens the precharge contactor at the step 132, which is allocated a time 132.

The times T1 to T8 in connection with the method 100 are not to scale. In this example, the total of the times T1 to T8 does not exceed a target time for startup, such as no more than 400 milliseconds. Other targets are possible in other examples.

Given the target time for startup, baseline (or nominal) times for each of the steps 104 to 132 can be established, as well as maximum allowable time for each of the steps 104 to 132. During startup, if any of the steps 104 to 132 exceed the maximum allowable time, an error may be generated and the startup stopped. A mechanical failure, for example, may cause on or more of the steps 104 to 132 to exceed the maximum allowable time.

Given the target time for startup, a person having skill in this art would be able to calculate the baseline time periods, and the maximum possible time periods for the steps 104 to 132.

In one example, the time T5 for the step 120 is nominally 110 milliseconds and has a maximum of 122 milliseconds.

To adjust the time spent precharging, the method 100 may intentionally adjust the time T5. In this example, the time T5 is increased from a baseline precharge time period so that the powertrain 10 is intentionally precharged for an adjusted time period time rather than the baseline precharge time period T5. The adjusted time period, which is a first time period, is different than the baseline precharge time period T5, which is a second time period in this example.

In this disclosure, the baseline precharge time period refers to the time spent precharging during the baseline start sequence for the electric vehicle shown in FIG. 3. The baseline start sequence refers generally to the start sequence that is executed to start the electric vehicle when increasing the precharge time period is not possible or desirable.

In a first embodiment, the method 100 includes a step of determining if power to the wheels 26 of the powertrain 10 will be required within a set time after initiating the method 100. If power is not required within one second, for example, the baseline precharge time period T5 is increased to the adjusted precharge time period.

The method 100 may determine that power is not required within the set time if a user remotely starts a vehicle having the powertrain 10, if the vehicle is unoccupied, or if the vehicle is charging. In such situations, power to the wheels of the powertrain 10 would not be required until a driver enters the vehicle.

In another embodiment of present disclosure, the method 100 stays at the step 120 for a maximum allowable time and then checks a voltage differential across the precharge contactor 76. If the voltage differential is below a threshold value, such as 20 volts, the method 100 proceeds to the step 124.

In the prior art methods, the voltage differential may have been checked, but after waiting a nominal amount of time, say 110 milliseconds, instead of a maximum allowable time of, for example, 122 milliseconds. This embodiment thus gains 12 milliseconds of precharging time. The adjusted time period is the maximum allowable time in this embodiment.

In another embodiment of the present disclosure, the method 100 calculates the actual time spent completing at least one of the steps 104, 108, 112, and 116. The difference or differences between the actual times completing the steps and the maximum allocated times T1 to T4 are then calculated as a total available difference.

The total available difference is then added to the time spent precharging, which increases the time spent precharging. Since the times T1 and T4 are maximum allowable times, the actual time for completing the steps 104, 108, 112, and 116 is likely less than T1+T2+T3+T4. In this embodiment, the difference is used to desirably increase precharging time, while still keeping the total time spent conducting the method 100 at less than the total of T1 to T8.

Relatively high in-rush currents can decrease the life of some components. Features of the disclosed examples includes increasing a time spent precharging an electric vehicle to increase the life of switching elements and other components of the powertrain.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of precharging a powertrain, comprising:
   intentionally precharging a powertrain of an electric vehicle through a precharge contactor for a first time period that is different than a second baseline precharge time period for precharging the precharge contactor, wherein the first time period is greater than the second baseline precharge time period.

2. The method of claim 1, wherein the first time period is a time period that is adjusted from the second, baseline precharge time period.

3. The method of claim 1, further comprising intentionally precharging for the first time period rather than the second, baseline precharge time period in response to the electric vehicle starting remotely rather than not starting remotely.

4. The method of claim 1, further comprising intentionally precharging for the first time period rather than the second, baseline precharge time period in response to the electric vehicle being unoccupied rather than occupied.

5. The method of claim 1, further comprising intentionally precharging for the first time period rather than the second, baseline precharge time period in response to the electric vehicle charging.

6. The method of claim 1, further comprising stopping the precharging after both expiration of the first time period and a voltage differential falling below a threshold value.

7. The method of claim 6, wherein the voltage differential is a voltage differential across a main contactor.

8. The method of claim 1, wherein the first time period is used rather than the second, baseline precharge time period in response to at least one step in a start sequence completing before an allotted maximum time for the at least one step.

9. The method of claim 8, wherein the second, baseline precharge time period is an increase of the first time period by an amount corresponding to a difference between the allotted maximum time for the at least one step and an actual time for the at least one step.

10. The method of claim 8, wherein the at least one step includes at least a primary contactor close command step, a primary contactor closing step, a precharge contactor close command step, and a precharge contactor closing step.

11. The method of claim 1, wherein the time spent precharging changes an in-rush current to the powertrain, the in-rush current from a battery of the electric vehicle having the precharge contactor.

12. An electric vehicle precharge assembly, comprises: a precharge contactor transitionable back and forth between an open state and a closed state; and a controller configured to selectively keep the precharge contactor in the closed state for an first time period that is different than a second baseline precharge time period for the precharge contactor, wherein the first time period is greater than the second baseline precharge time period.

13. The assembly of claim 12, wherein the controller keeps the precharge contactor in the closed state for the first time period in response to the electric vehicle starting remotely rather than not starting remotely.

14. The assembly of claim 12, wherein the controller is configured to transition a main contactor to a closed state after the first time period ends and a voltage differential falls below a threshold value, the main contactor in the closed state causing current to move through the main contactor rather than the precharge contactor.

15. The assembly of claim 12, wherein the first time period is used rather than the second, baseline precharge time period when at least one step in a start sequence completes before an allotted maximum time for the at least one step, wherein the first time period is greater than the second, baseline precharge time period by an amount representing a difference between the allotted maximum time for the at least one step and an actual time to complete the at least one step.

16. The assembly of claim 12, wherein the time spent precharging changes an in-rush current to a powertrain of the electric vehicle, the in-rush current provided by a battery of the electric vehicle.

17. The assembly of claim 12, including a battery of the electric vehicle, a first main contactor having a first polarity and a second main contactor having a second polarity opposite the first polarity, wherein the controller is configured to transition the precharge contactor to the closed state to move current through the precharge contactor when the first main contactor is in a closed state and the second main contactor is in an open state.

18. The assembly of claim 17, wherein the controller is configured to transition the second main contactor to the closed state in response to a delta voltage across the second main contactor that is less than a certain value.

19. The assembly of claim 17, wherein a circuit between a battery and a motor is complete when the precharge contactor and the first main contactor are in a closed state, or when the first main contactor and the second main contactor are in the closed state.

20. The assembly of claim 12, wherein the controller is a battery electric control module.

* * * * *